(12) United States Patent
Scollo et al.

(10) Patent No.: US 7,852,014 B2
(45) Date of Patent: Dec. 14, 2010

(54) METHOD AND CELL FOR CONTROLLING THE POWER FACTOR OF A POWER SUPPLY LINE

(75) Inventors: Rosario Scollo, Misterbianco (IT); Santina Leo, Furci Siculo (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 984 days.

(21) Appl. No.: 11/601,460

(22) Filed: Nov. 17, 2006

(65) Prior Publication Data

US 2007/0132437 A1    Jun. 14, 2007

Related U.S. Application Data

(63) Continuation-in-part of application No. PCT/IT2004/000280, filed on May 18, 2004.

(51) Int. Cl.
  *H05B 41/24* (2006.01)
(52) U.S. Cl. .................. 315/247; 315/307; 315/291; 323/284; 323/288; 323/289
(58) Field of Classification Search .............. 315/247, 315/307, 291, 224, 209 R, DIG. 4; 323/222, 323/282, 284, 289, 290, 288, 285; 363/89
See application file for complete search history.

(56) References Cited

U.S. PATENT DOCUMENTS 5,500,576 A *  3/1996  Russell et al. ............... 315/307
5,532,528 A    7/1996  Lammers
5,798,616 A *  8/1998  Takehara et al. ............ 315/247
5,925,990 A *  7/1999  Crouse et al. .............. 315/307
5,998,930 A * 12/1999  Upadhyay et al. ........... 315/247
6,906,503 B2 * 6/2005  Lopez-Santillana et al. . 323/283
2006/0087298 A1* 4/2006  Turchi ...................... 323/265

FOREIGN PATENT DOCUMENTS

EP  0059053 A   9/1982
JP  08294282    11/1996

OTHER PUBLICATIONS

International Search Report, PCT/IT2004/000280, Feb. 1, 2005.
Eissa, M.O., et al., A Fast Analog Controller For A Unity-Power-Factor AC/DC Converter, APEC 1994 Conference, IEEE, vol. 13., pp. 551-555, Xp010118522, Feb. 1994.
Masuda, Tetsuhiko, TDK's Technology Reduces Harmonic Current Distortion, JEE, vol. 30, No. 319, XP000377862, pp. 70-73, Jul. 1, 1993.

* cited by examiner

*Primary Examiner*—Douglas W Owens
*Assistant Examiner*—Ephrem Alemu
(74) *Attorney, Agent, or Firm*—Lisa K. Jorgenson; Paul F. Rusyn; Graybeal Jackson LLP (57) ABSTRACT

A method and system controls the power factor associated with a power supply line. The system includes a control circuit having a power factor control cell connected to the power supply line. The power factor control is performed by modulating the conduction time of a bipolar transistor in the control cell using the storage time of the bipolar transistor, and by regulating the modulation of the conduction time by feedback-driving a control terminal of the bipolar transistor.

31 Claims, 7 Drawing Sheets

METHOD AND CELL FOR CONTROLLING THE POWER FACTOR OF A POWER SUPPLY LINE

PRIORITY CLAIM

The present application is a Continuation-In-Part application of International Patent Application No. PCT/IT2004/000280, published in English, filed May 18, 2004, which application is incorporated herein by reference in its entirety.

TECHNICAL FIELD

Embodiments of the present invention relate to methods and circuits for controlling the power factor of a power supply line and to a corresponding control circuit.

BACKGROUND

As it is well known, fluorescent lamps have always been driven using the so-called magnetic ballasts.

However, the need for more and more power together with an improved power quality has made it necessary to develop circuit topologies capable of offering improved electric performances and advantages also in terms of weight and size.

From the physical point of view, the weight and size of the components of these circuit topologies have been reduced by using applications operating at a higher frequency than the supply frequency (typically 50-60 Hz), essentially to replace the heavy magnetic ballasts, providing some advantages in terms of performances, weight and size.

From the electric point of view, performances have been improved mainly in terms of the quality of the supplied electric power. In particular, the problem of the harmonic content linked to the use of circuit topologies comprising components operating at high frequencies has been addressed, this harmonic content being capable of decreasing the so-called power factor or PF (acronym of the English "Power Factor").

In fact, as it is well known, in the normal operation of an electronic ballast, the power transfer from a power supply line to a high frequency circuit portion is performed by using a rectifying section composed of a diode bridge and an electrolytic clamping capacitor.

This rectifying section simply turns a line voltage from alternate (AC) to direct (DC). Unfortunately, the intermittent operation of the diodes comprised therein presents to the power supply line a pulsating current with a high harmonic component, a characteristic which lowers the power factor PF (generally to about 0.5).

Several methods have been implemented, which are suitable for increasing the power supplied by the circuits and reducing the harmonic content in the line current to which these circuits are connected.

One of these known methods provides the use of a circuit network capable of correcting the power factor PF. This network is commonly indicated with the term PFC cell. The main feature of this network is that it creates a current wave-form at the electronic ballast input being sinusoidal and phased with the line voltage.

One of the most widespread circuit topologies to realize such a network is the one based on the principle being generally known as boost converter.

Figure 1:
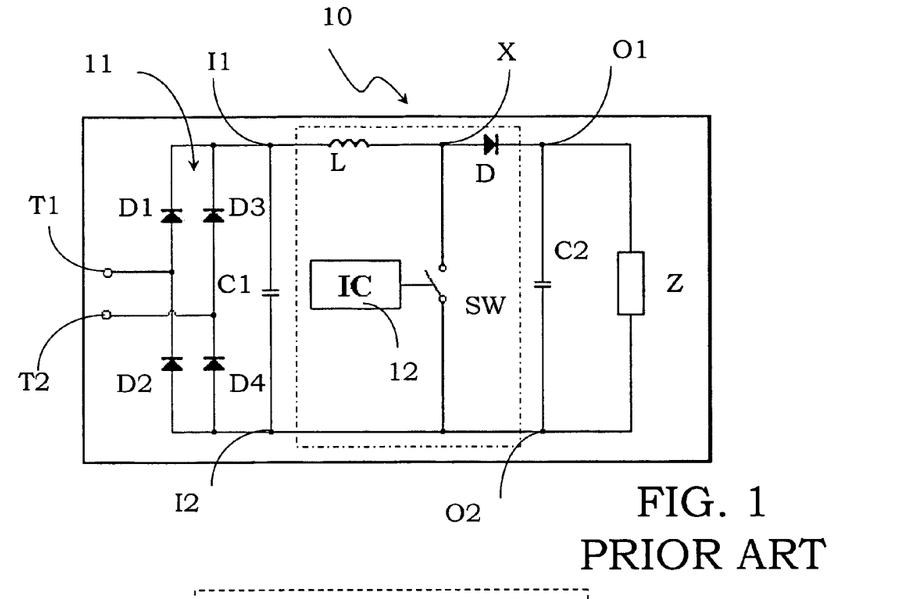
FIG. 1 schematically shows a PFC cell based on the principle of the IC-driven boost converter.

A traditional diagram of a PFC cell based on this principle is schematically shown in FIG. 1.

The PFC cell 10 essentially comprises a controlled switch SW.

In particular, the PFC cell 10 has a first I1 and second input terminal I2, as well as a first O1 and second output terminal O2.

The first input terminal I1 is connected to the first output terminal O1 by means of the series connection of an inductor L and a diode D, connected to each other in correspondence with an inner circuit node X.

The second input terminal I2 is directly connected to the second output terminal O2.

The controlled switch SW is inserted between the inner circuit node X and the second input terminal I2, i.e. the second output terminal O2 and it has a driving terminal connected to a convenient driving circuit 12.

The PFC cell 10 is connected to a first T1 and a second network terminal T2 by means of a diode bridge 11. In particular, the diode bridge 11 comprises a first pair of diodes D1, D2 inserted between the first input terminal I1 and the second input terminal I2 of the PFC cell 10 and interconnected in correspondence with the first network terminal T1, as well as a second pair of diodes D3, D4 inserted, in parallel with the first pair of diodes D1, D2, between the first input terminal I1 and the second input terminal I2 and interconnected in correspondence with the second network terminal T2. The diode bridge 11, comprising the pairs of diodes D1-D2 and D3-D4, serves as an input rectifying bridge.

The PFC cell 10 also has the input I1, I2 and output O1, O2 terminals respectively connected to a first capacitor C1 and a second capacitor C2.

The PFC cell 10 is finally connected to a load Z inserted between the output terminals O1 and O2.

The assembly of the capacitor C2 and the PFC cell 10 substantially realizes an active filter driven by the driving circuit 12 and being capable of controlling the harmonic content of the power absorbed by the load.

In the great majority of cases, the switch SW is an electronic switch realized with an active component of the MOSFET type, driven by the integrated IC driving circuit 12 so as to regulate the conduction time thereof.

However, the use of an integrated circuit IC to drive the electronic switch SW makes the circuit topology of the PFC cell 10 shown in FIG. 1 expensive and thus suitable for higher-priced products.

The need thus exists in the market of new systems using low-cost PFC cells to meet the requirements of lower-priced, more economical products, following in the meantime new regulations and needs for a better and better quality of the power supplied.

The removal of the integrated circuit IC being used in known solutions to modulate the conduction time of the PFC cell switch leads, however, to a drastic decrease of the PFC cell performance.

SUMMARY

Embodiments of the present invention exploit the intrinsic electric features of a bipolar power transistor to modulate the transistor conduction time and to use a feedback driving of the control terminal thereof to regulate such a modulation.

Embodiments of the present invention can provide a driving method and a corresponding topology of PFC cells, particularly for electronic ballasts, having a more favorable cost-performance ratio, thus overcoming the limits and drawbacks still affecting prior art PFC cells with integrated IC driving circuit.

The features and advantages of power factor control methods and circuits according to the invention will be apparent from the following description of embodiments thereof given by way of non-limiting example with reference to the attached drawings.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of the invention particularly relate, but not exclusively, to a control circuit using a PFC (acronym of the English "Power Factor Corrector") cell for controlling an electronic driving ballast of a fluorescent lamp and the following description is made with reference to this field of application for convenience of illustration only.

Figure 2:
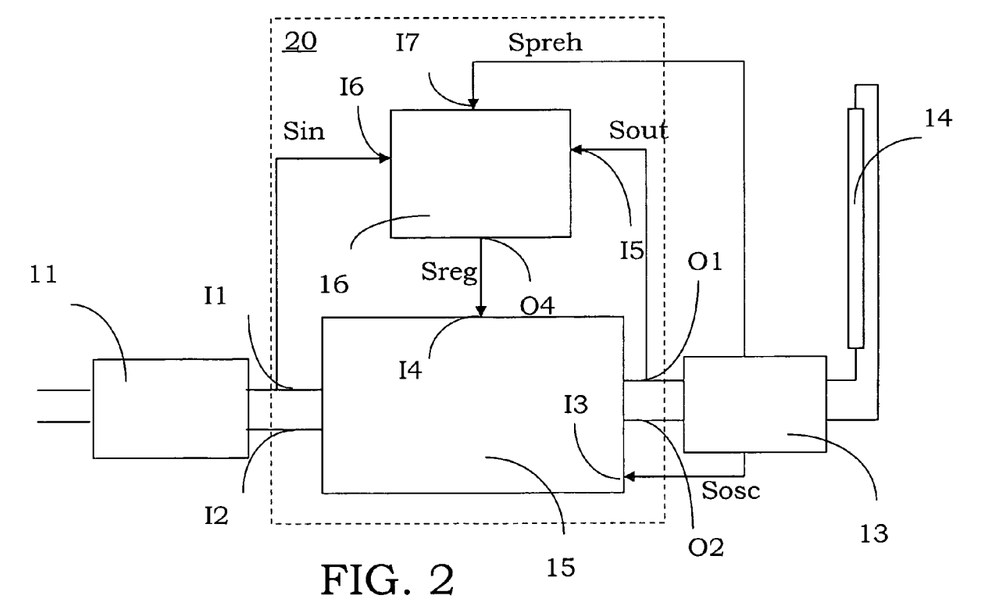
FIG. 2 schematically shows a block diagram of an electronic ballast for fluorescent lamps realized according to embodiments of the invention.

With reference to these drawings, and particularly to FIG. 2, a control circuit connected to an electronic ballast for fluorescent lamps is shown hereafter, realized according to an embodiment of the invention and globally indicated with 20. Elements being structurally and functionally similar to the devices shown with reference to the prior art have been given the same numeral references.

The control circuit 20 is connected to a power supply line by means of a filter input section 11 of the type comprising a diode bridge and it is connected to an electronic ballast 13 being connected in turn to a fluorescent lamp 14.

The assembly of the input section 11, the control circuit 20, the electronic ballast 13 and the fluorescent lamp 14 is a fluorescent lighting system.

In particular, advantageously according to an embodiment of the invention, the control circuit 20 comprises a PFC cell 15 and a regulation block 16 being feedback-connected thereto. In the embodiment of FIG. 2, the PFC cell 15 is of the self-oscillating type and the electronic ballast 13 and the fluorescent lamp 14 are the load thereof.

As it will be better seen hereinafter in the description, the PFC cell 15 modulates the conduction time by using the storage time of a bipolar transistor, while the regulation block 16 both corrects and protects such a PFC cell.

The PFC cell 15 of the control circuit 20 according to this embodiment of the invention has a first I1 and second input terminal I2 connected to respective output terminals of the input section 11, as well as a first O1 and second output terminal O2 connected to respective input terminals of the electronic ballast 13.

Moreover, the PFC cell 15 has a third input terminal I3 connected to the electronic ballast 13 and receiving therefrom a driving signal Sosc, as well as a forth input terminal I4 connected to an output terminal O4 of the regulation block 16 and receiving therefrom a regulation signal Sreg. In particular, in the example of FIG. 2, the PFC cell 15 receives an oscillating driving signal Sosc.

The regulation block 16 has in turn a first input terminal I5 connected to the first output terminal O1 of the PFC cell 15 and receiving an output signal Sout and a second input terminal I6 connected to the first input terminal I1 of the PFC cell 15 and receiving a primary input signal Sin.

Finally, the regulation block 16 has a third input terminal I7 connected to the electronic ballast 13 and receiving therefrom a pre-heating signal Spreh.

Figure 3A:
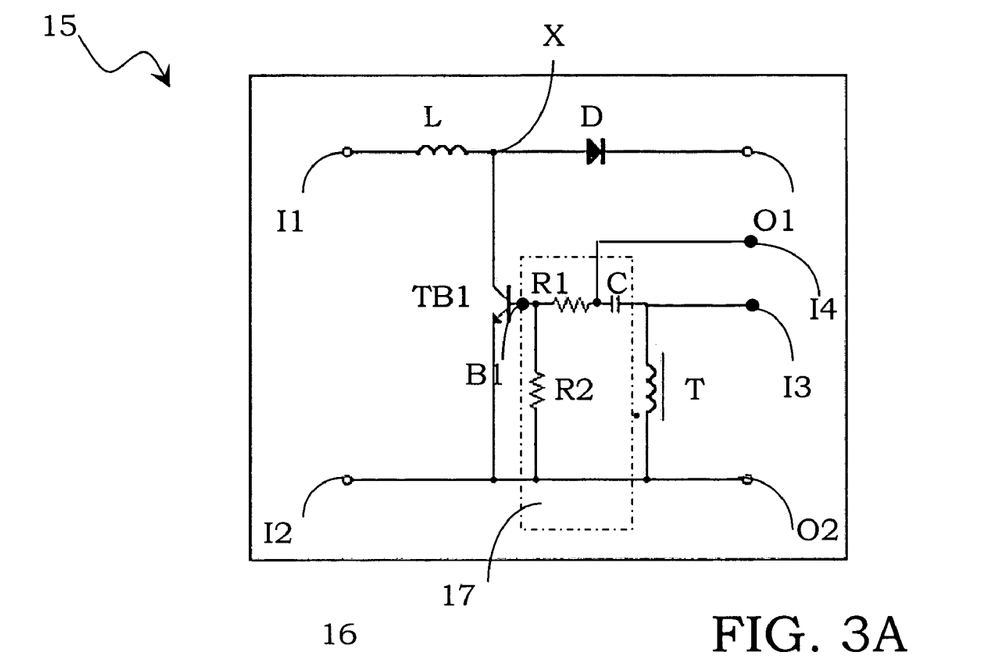
FIGS. 3A and 3B show preferred embodiments of details of the block diagram of FIG. 2.

In greater detail, referring to FIG. 3A, the PFC cell 15 essentially comprises a conveniently driven bipolar transistor TB1.

In particular, the PFC cell 15 has the first input terminal I1 connected to the first output terminal O1 by means of the series connection of an inductor L and a diode D, connected to each other in correspondence with an inner circuit node X.

The second input terminal I2 is directly connected to the second output terminal O2.

The bipolar transistor TB1 is inserted between the inner circuit node X and the second input terminal I2, i.e. the second output terminal O2 and it has a control terminal, particularly a base terminal B1, connected, by means of an RC network 17, to a winding T of a transformer, connected in turn to the second output terminal O2.

In particular, the base terminal B1 of the bipolar transistor TB1 is connected to the winding T by means of the series of a first resistor R1 and a capacitor C of the RC network 17, as well as to the second output terminal O2 by means of a second resistor R2 of the RC network 17.

The interconnection point between the first resistor R1 and the capacitor C of the RC network 17 defines the forth input terminal I4 of the PFC cell 15. Moreover, the interconnection point between the capacitor C of the RC network 17 and a winding T of a transformer, connected in turn to the second output terminal O2, defines the third input terminal I3 of the PFC cell 15.

It should be noted that the use of the bipolar transistor TB1 and of the specific electric features thereof, together with the driving modes according to this embodiment of the invention, allows a simple and economical PFC cell 15 to be realized.

In particular, the PFC cell 15 according to this embodiment of the invention implements a modulation method of the conduction time of the bipolar transistor TB1 exploiting the well known phenomenon according to which the charges injected in the base terminal of a bipolar transistor allow the bipolar transistor saturation effect and they determine the conduction time thereof.

By exploiting this feature as the transistor storage time, the PFC cell 15 according to this embodiment of the invention thus succeeds in modulating the transistor turn-on time without introducing any integrated circuit, as is the case in prior art circuits.

In other words, the PFC cell 15 is a circuit topology interposing, between the rectifying-bridge input section 11 and a high frequency section such as the electronic ballast 13, a network comprising an inductor, a diode and a bipolar transistor changing the wave-form envelope of the current absorbed by the power supply line, making the envelope thereof almost sinusoidal and thus allowing a power factor with values close to one to be obtained.

It should be noted that the capacitor C, in series with the base terminal B1 of the bipolar transistor TB1, together with the resistance R1 always in series with this base terminal B1, determine the conduction time constant of the bipolar transistor TB1 and they allow a duty cycle being less than 50% to be realized.

In particular, advantageously according to an embodiment of the invention, the duty cycle regulation effect is obtained by exploiting the features of the RC network 17 together with the storage time changes of the bipolar transistor TB1 in correspondence with the different currents flowing in the collector terminal which must be switched by the bipolar transistor TB1.

In fact, since the bipolar transistor TB1 turns off only when the charges stocked in the base region have been all extracted, a certain delay occurs between the phase wherein the voltage does not bias the base terminal B1 any more and the time wherein the bipolar transistor TB1 actually turns off.

It is also important to underline that the storage time is linked to the values of the current involved and, for the same base current in the conduction phase, it increases as the collector current decreases.

For input voltage values varying around ±10-15% of a nominal voltage value, the transistor regulates the power factor PF through a modulation of the conduction time determined by the storage time thereof.

The PFC cell 15 of the control circuit 20 is substantially an active PFC cell being capable of modulating the conduction time of the bipolar transistor TB1.

Moreover, in an embodiment of the invention, a PFC cell 15 of the self-oscillating type is used, being driven by a signal Sosc coming from the electronic ballast 13.

Figure 3B:
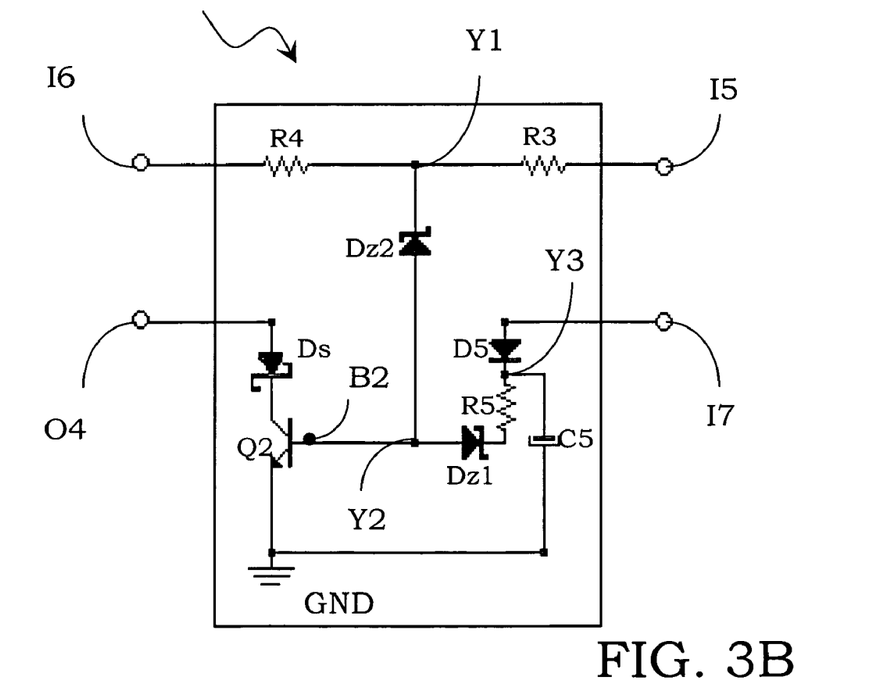

Advantageously according to an embodiment of the invention, the control circuit 20 also comprises a regulation block 16, connected to the PFC cell 15 and shown in greater detail in FIG. 3B.

In particular, the regulation block 16 has a first I5 and a second input terminal I6 connected to each other by means of a first R3 and a second resistive element R4, interconnected in correspondence with a first inner circuit node Y1.

The regulation block 16 essentially comprises a supplementary transistor Q2 of the bipolar type being inserted between an output terminal O4 of the regulation block 16 and a voltage reference, particularly a ground GND, and having a control terminal, particularly a base terminal B2 connected to a second inner circuit node Y2. A Shottky diode Ds is inserted between the output terminal O4 and a collector terminal of the supplementary transistor Q2.

The regulation block 16 also has a third input terminal I7 connected to the second inner circuit node Y2 by means of the series of a diode D5, a resistor R5 and a first Zener diode Dz1. A second Zener diode Dz2 is inserted between the first Y1 and the second inner circuit node Y2.

Finally, the regulation block 16 comprises an electrolytic capacitor C5 inserted between a third inner circuit node Y3 and the ground GND, this third inner circuit node Y3 being the interconnection point between the diode D5 and the resistor R5.

In substance, the regulation block 16 according to this embodiment of the invention implements the regulation phase of the obtained conduction time modulation of the bipolar transistor TB1 of the PFC cell 15, carrying on a correction thereof for the third harmonic distortion and a regulation of an output power value by means only of the regulation signal Sreg applied to the forth input terminal I4 of the PFC cell 15.

Advantageously according to an embodiment of the invention, the regulation block 16 also ensures a protection of the transistor TB1 of the PFC cell 15 during the start-up phase, limiting an input voltage value thereof as soon as a corresponding current value reaches high values.

To this purpose, the regulation block 16 uses three input signals:
the primary input signal Sin corresponding to the line voltage;
the output signal Sout corresponding to the output voltage signal of the PFC cell 15;
the pre-heating signal Spreh corresponding to a voltage value being proportional to a start-up current during the pre-heating and turn-on phases of the fluorescent lamp 14.

In particular, the regulation block 16 serves to reduce the conduction duty-cycle of the bipolar power transistor TB1 in the PFC cell 15, if necessary, by limiting the current reaching the base terminal B1 thereof.

Moreover, in order to regulate the harmonic distortion of the control circuit 20, the regulation block 16, advantageously according to this embodiment of the invention, uses as input signal Sin the rectified sinusoidal line voltage value. In this way, as soon as the value of this signal Sin and thus of the rectified sinusoidal line voltage exceeds the Zener voltage value of the second diode Dz2, the regulation block 16, through the second resistor R4 injects some current in the base terminal B2 of the supplementary transistor Q2, this current being proportional to the sinusoidal line voltage value.

Furthermore, in order to regulate the power of the control circuit 20, the regulation block 16 according to an embodiment of the invention advantageously uses the output signal Sout of the PFC cell 15. In this way, as soon as the value of this signal Sout and thus of the output voltage of the PFC cell 15 exceeds the Zener voltage value of the second diode Dz2, the regulation block 16, by means of the first resistor R3, injects some current in the base terminal B2 of the supplementary transistor Q2, this current being proportional to the difference between the output voltage value Sout and the Zener voltage value.

Moreover, in order to protect the power transistor during the start-up phase of the fluorescent lamp 14, the regulation block 16 according to an embodiment of the invention advantageously uses the value of the alternate voltage of the secondary winding T driving the PFC cell 15 as the pre-heating signal Spreh applied to the third input terminal I7.

In particular, this voltage is rectified by the diode D5 and clamped by the capacitor C5. When the obtained direct voltage value exceeds the Zener voltage value of the first Zener diode Dz1, by means of the resistor R5, the regulation block 16 injects some current in the base terminal B2 of the supplementary transistor Q2.

Finally, the Shottky diode Ds serves to stop the inverse current on the supplementary transistor Q2, ensuring the low voltage drop thereof during the direct conduction phase.

More generally, embodiments of the present invention provide a power factor control method of a power supply line through the modulation of the conduction time of a bipolar transistor in a PFC cell.

Advantageously according to embodiments of the invention, the control method provides that the modulation of the bipolar transistor conduction time is performed by means of a control signal derived from an elementary alternate-trend signal applied to the base terminal B1 of the bipolar transistor TB1, particularly drawn from a winding of a transformer and applied to the base terminal by means of the RC network 17.

It should be noted that, advantageously according to embodiments of the invention, not only a control signal is required to drive the base terminal B1 of the bipolar transistor TB1, particularly generated by an integrated circuit serving as a modulator, but this control signal is advantageously drawn from an already existing signal.

In particular, this already existing signal is a signal drawn through a supplementary winding T on a transformer already comprised in applications which generally use transformers operating at high frequency.

A voltage signal generated on the transformer thus biases the base terminal B1 of the bipolar transistor TB1 by means of the RC network 17, essentially comprising a capacitor and two resistors.

Advantageously according to embodiments of the invention, the control method also provides a regulation phase of the conduction time modulation of the bipolar transistor TB1 by feedback-driving the base terminal B1 thereof.

In particular, this regulation phase provides a current injection in this base terminal B1 being performed by the supplementary transistor Q2 in response to a value of a regulation signal Sreg.

In detail, the conduction action of the supplementary transistor Q2 interacts with the natural modulation due to the storage time change of the bipolar transistor TB1 as follows:
- it reduces the charging time constant of the capacitor C, reducing the time of the turn-on base current Ibon of the bipolar transistor TB1.
- it realizes a path to ground for the turn-on base current Ibon of the bipolar transistor TB1, reducing the amplitude thereof.

Advantageously according to embodiments of the invention, the combination of the two above-mentioned effects allows a reduction of the conduction duty-cycle of the bipolar transistor TB1 to be obtained.

Moreover, during the intervention, the conduction of the supplementary transistor Q2 helps to correct the third harmonic distortion and to reduce the power increase occurring when the line voltage value increases.

Advantageously according to embodiments of the invention, the regulation block 16 also implements a protection phase of the bipolar transistor TB1 always through the conduction of the supplementary transistor Q2. In particular, this protection phase triggers only in the start-up phase of the fluorescent lamp 14 weighting much more on the conduction of the supplementary transistor Q2, considerably reducing the output voltage value of the PFC cell 15.

Figure 4:
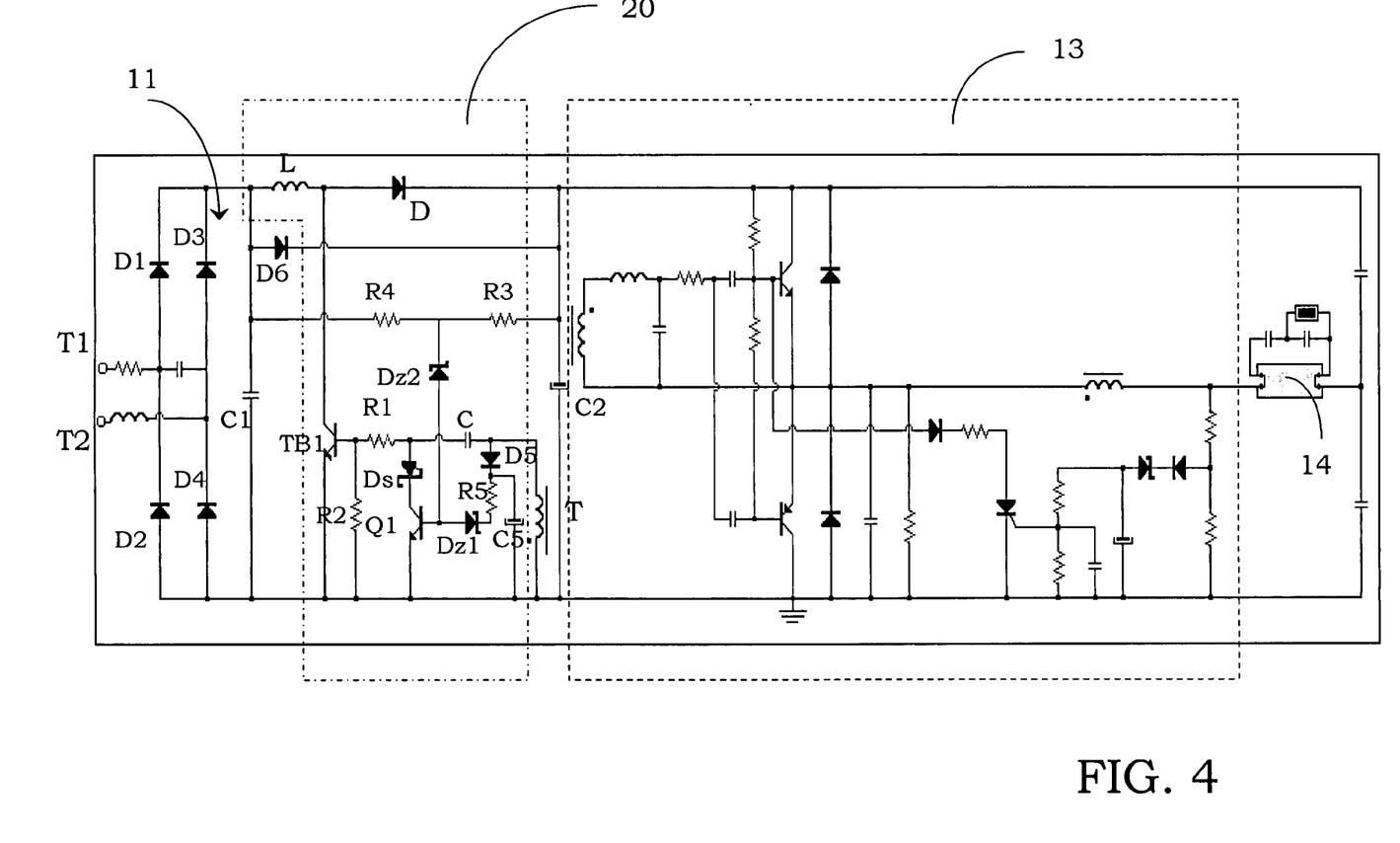
FIG. 4 schematically shows a circuit embodiment of an electronic ballast comprising a control circuit of FIG. 2.

An application of the control circuit 20 is schematically shown in FIG. 4 for a lighting system. In particular, the driving voltage of the bipolar transistor TB1 of the PFC cell 15 is obtained by means of an auxiliary winding T on a transformer of an electronic ballast 13.

The control circuit 20 is inserted in the power supply of this electronic ballast 13 and connected to a first and a second network terminal T1, T2 by means of an input section 11 of the diode bridge type.

The control circuit 20 is also uncoupled at the input and output thereof by means of a first C1 and a second capacitor C2. The input section 11 in FIG. 4 also comprises a supplementary diode D6 suitable to realize a filtering block in association with the first capacitor C1.

In particular, the PFC cell 15 comprised in the control circuit 20 has the first and second input terminals I1, I2 connected to the input section 11 and the first and second output terminals O1, O2 connected to the electronic ballast 13.

Moreover, these first and second input terminals I1, I2 are connected to each other by means of the first capacitor C1 and these first and second output terminals O1, O2 are connected to each other by means of the second capacitor C2.

FIGS. 5A-5B, 6A-6B, 7A-7B and 8 show the wave-forms related to the collector-emitter voltage Vce, the collector current Ic and the base current Ib of the bipolar transistor TB1, as well as the network current In, respectively comprising and not comprising a regulation block 16 realized according to an embodiment of the invention.

Figure 5A:
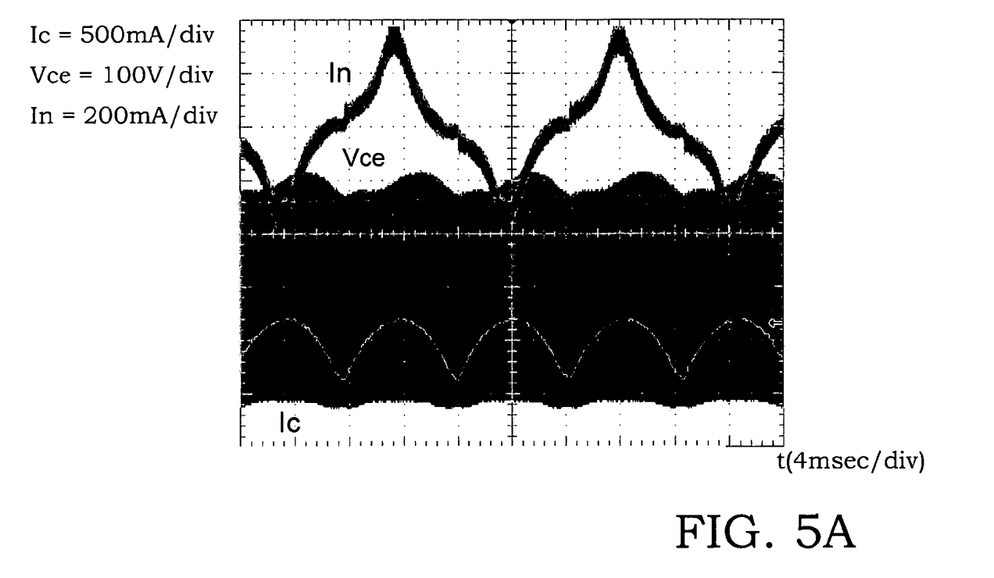
FIGS. 5A-5B, 6A-6B, 7A-7B and 8 show the trend in time of signals inside the control circuit of FIG. 2.
Figure 5B:
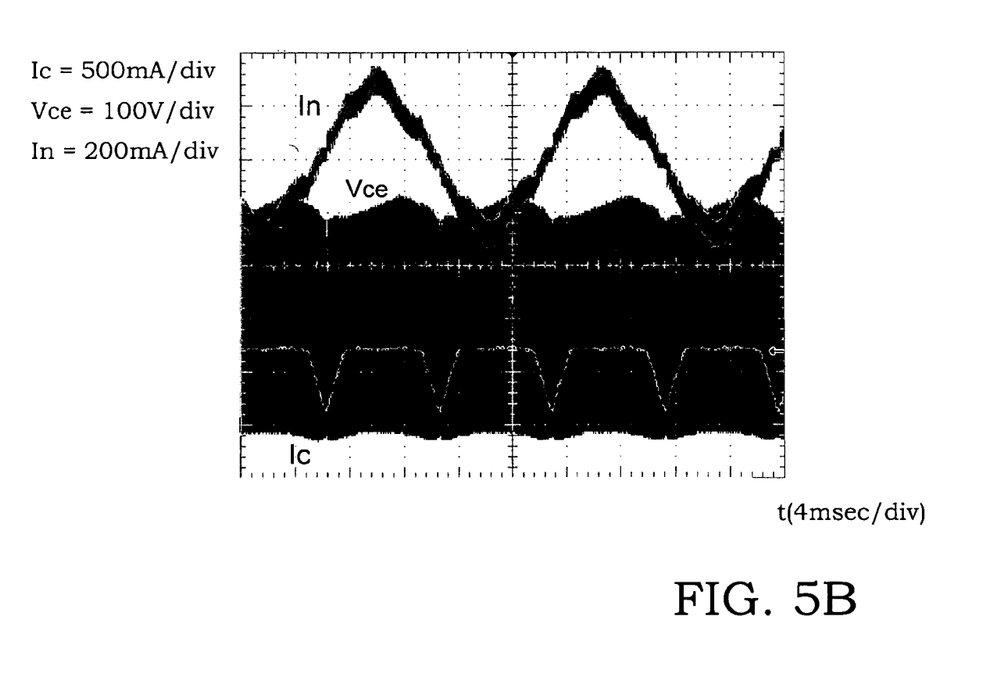

In particular, FIGS. 5A and 5B show the trend of a network current signal In, a collector current value Ic of the bipolar transistor TB1 and a voltage value between the collector and emitter terminals Vce again of the bipolar transistor TB1.

It can be immediately noticed that the trend of the network current In in FIG. 5A is almost sinusoidal unlike the waveform of this network current In shown in FIG. 5B, without the regulation block 16. The substantially sinusoidal trend of the network current In induced by the regulation block 16 results in a lower third harmonic distortion.

In particular, from experimental tests carried out by the Applicant itself, the following results have been obtained:

TABLE I control circuit 20 with regulation block 16 according to an embodiment of the invention

| Vin (V) | Power (W) | Third harmonic distortion | P.F. |
|---|---|---|---|
| 220 | 39.6 | 9.8% | 0.98 |
| 230 | 41.2 | 10.6% | 0.98 |
| 240 | 41.9 | 11.2% | 0.98 |

Table II control circuit 20 without regulation block 16

| Vin (V) | Power (W) | Third harmonic distortion | P.F. |
|---|---|---|---|
| 220 | 37.6 | 29% | 0.95 |
| 230 | 39.4 | 28.7% | 0.952 |
| 240 | 41.9 | 29% | 0.954 |

From a comparison between these tables, it can be immediately noticed that the presence of the regulation block 16 allows a much lower third harmonic distortion factor to be obtained. Moreover, it is noticed that, when the power supply voltage varies from 220V to 240V, the power change is lower for the control circuit 20 comprising the regulation block 16.

It can be also noticed that the power factor of the control circuit 20 comprising the regulation block 16 reaches the value 0.98 vs. the value 0.95 obtained without this regulation block 16.

Figure 6A:
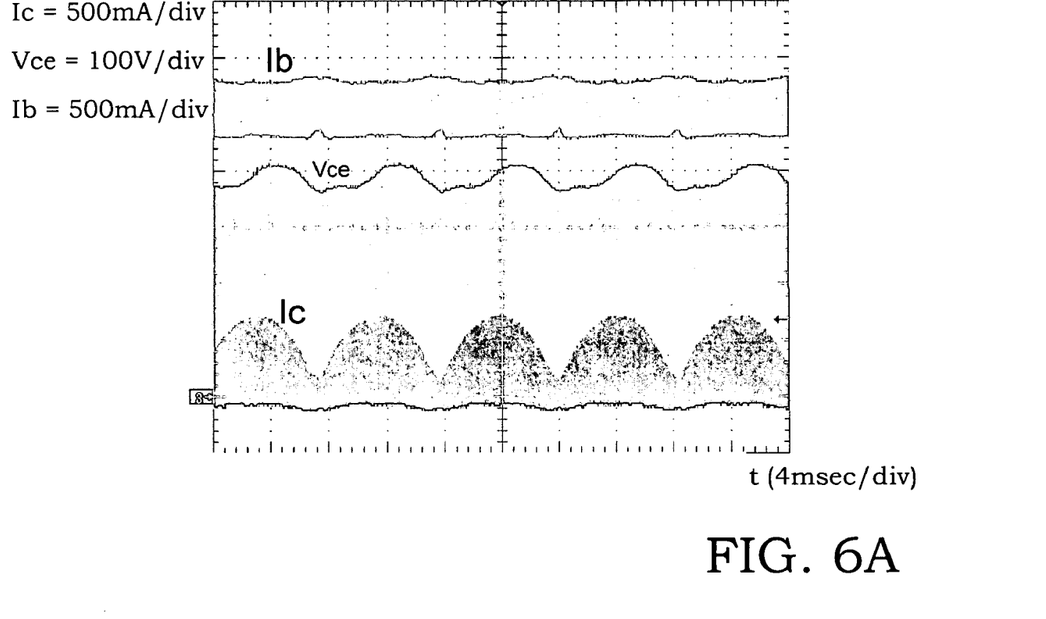
Figure 6B:
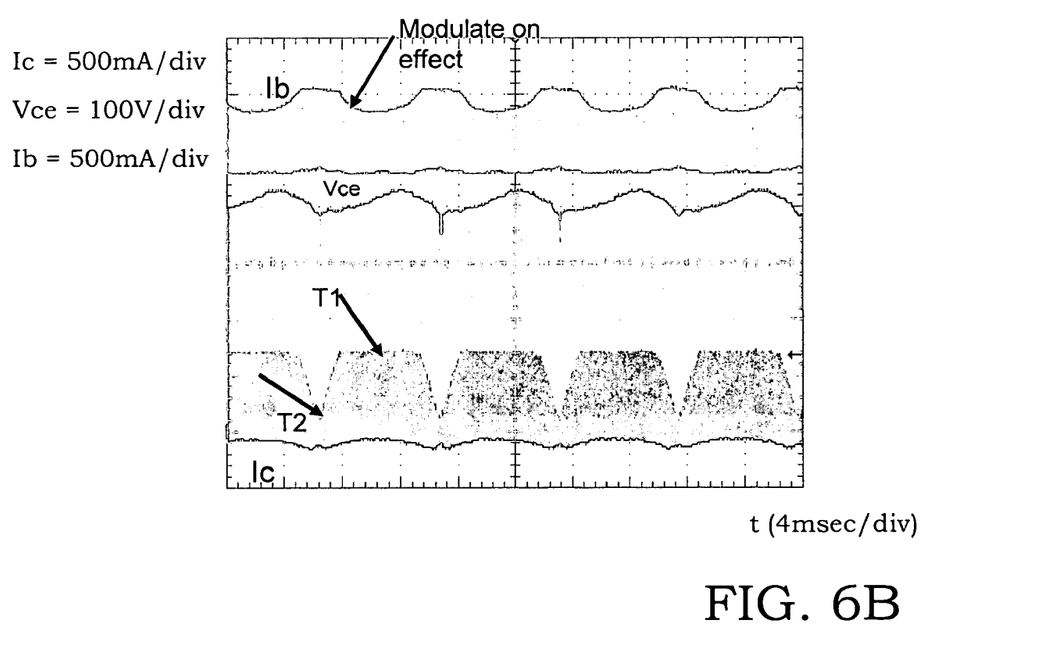

FIGS. 6A and 6B show the envelopes of the wave-forms related to the base current Ib signal, the collector current Ic signal of the bipolar transistor TB1 and the voltage signal between the collector and emitter terminals Vce again of the bipolar transistor TB1 in both cases, i.e. with or without the regulation block 16 in the control circuit 20.

In particular, FIG. 6B shows a modulation of the base current Ib which cannot be found in FIG. 6A. As previously seen and as it can be immediately noticed by analysing the above-mentioned tables, this modulation operates on the collector current Ic to obtain low values of the third harmonic distortion on the current absorbed by the network.

Figure 7A:
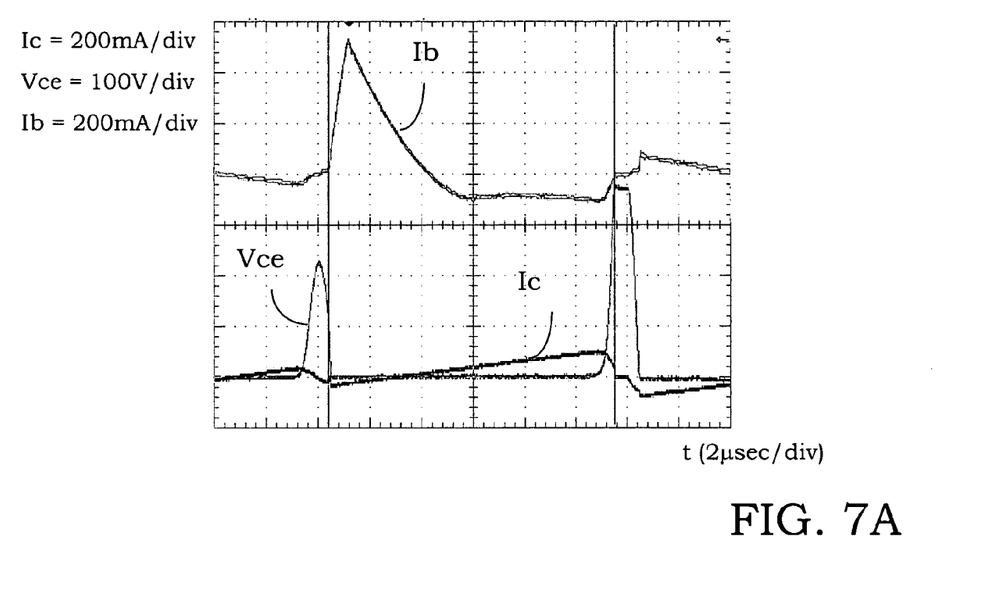
Figure 7B:
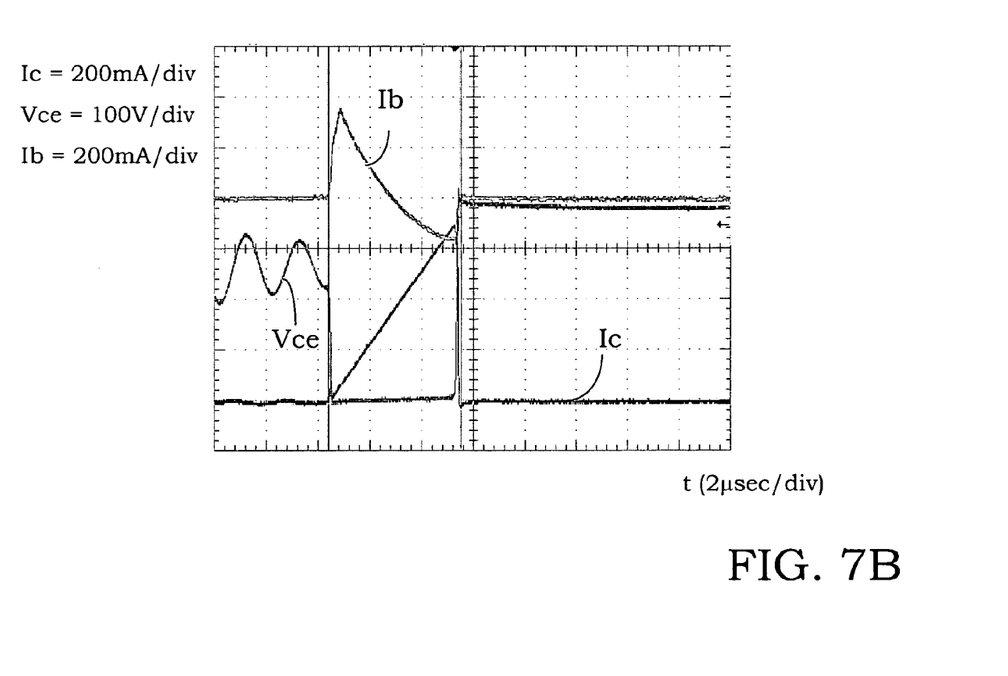

Moreover, FIGS. 7A and 7B show two details (indicated with T1 and T2 in FIG. 6B) corresponding to low and high values respectively of the collector current Ic. As it can be noticed, the turn-on time of the bipolar transistor TB1 is determined by the charge injection phase in the base terminal B1 thereof and by the charge extraction. Just this phenomenon determines the regulation and a variable duty-cycle for the bipolar transistor TB1. Moreover, the bipolar transistor TB1 is on from when charges are injected in the base region until the complete extraction thereof.

Figure 8:
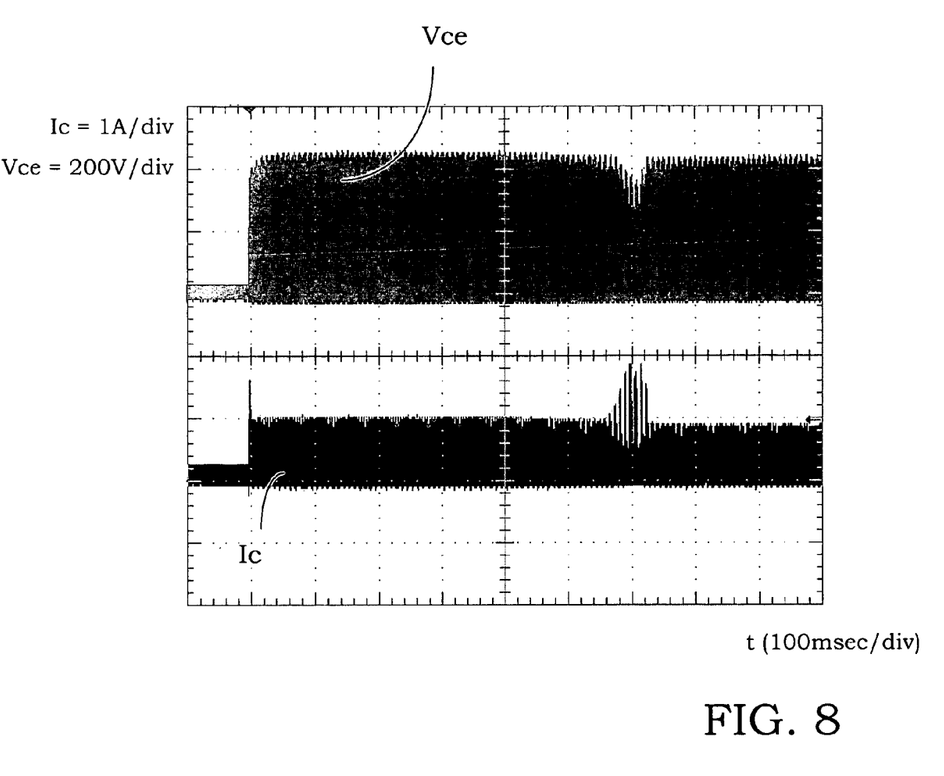

Finally, FIG. 8 shows the detail related to the pre-heating and start-up phases of the fluorescent lamp 14 with corresponding intervention of the protection realized by the regulation block 16 of the control circuit 20.

By analysing this FIG. 8 a reduction of the voltage Vce value to values lower than 400V can be noticed, as soon as the collector current Ic of the bipolar transistor TB1 reaches high values.

It should be remarked that the control circuit according to embodiments of the invention can be used in all those cases when it is necessary to modulate the conduction time of a power device without resorting to systems using integrated circuits and thus not exclusively electronic ballasts, used by way of non-limiting example.

From the foregoing it will be appreciated that, although specific embodiments of the invention have been described herein for purposes of illustration, various modifications may be made without deviating from the spirit and scope of the invention.

The invention claimed is:

1. A method for controlling the power factor of a power supply line, said method using a control circuit comprising a power factor control cell connected to said power supply line, wherein said power factor control is performed by modulating the conduction time of a bipolar transistor comprised in said control cell by using the storage time of said bipolar transistor and by regulating said modulation of the conduction time by feedback-driving a control terminal of said bipolar transistor.

2. A control method according to claim 1, wherein said regulation provides a current injection in said control terminal of said bipolar transistor.

3. A method for controlling the power factor of a power supply line, said method using a control circuit comprising:
a power factor control cell connected to said power supply line, wherein said power factor control is performed by, modulating the conduction time of a bipolar transistor comprised in said control cell using the storage time of said bipolar transistor, and
regulating said modulation of the conduction time by feedback-driving a control terminal of said bipolar transistor;
wherein said regulation provides a current injection in said control terminal of said bipolar transistor; and
wherein said current injection is carried out by a supplementary transistor comprised in a regulation block connected to said control terminal of said bipolar transistor.

4. A control method according to claim 3, wherein said regulation provides a reduction of the turn-on base current time of said bipolar transistor when said supplementary transistor is in its conduction state.

5. A control method according to claim 3, wherein said regulation provides a path to ground for a turn-on base current of said bipolar transistor, reducing the amplitude thereof when said supplementary transistor is in its conduction state.

6. A control method according to claim 3, wherein said regulation provides a duty cycle regulation of said bipolar transistor comprised in said power factor control cell carried out by said supplementary transistor when in its conduction state.

7. A control method according to claim 3, wherein said regulation provides a correction of the third harmonic distortion of said power factor control cell carried out by said supplementary transistor when in its conduction state.

8. A control method according to claim 3, wherein said regulation provides a control of the power outputted from said power factor control cell, when a voltage value of said power supply line increases, carried out by said supplementary transistor when in its conduction state.

9. A control method according to claim 3, wherein said regulation provides a protection of said bipolar transistor carried out by said supplementary transistor when in its conduction state.

10. A control method according to claim 9, wherein said protection triggers only in a start-up phase of a load connected to said power factor control cell weighting much more on said supplementary transistor when in its conduction state.

11. A circuit for controlling the power factor of a power supply line of the type comprising a first and second input terminal connected to said power supply line, as well as a first and second output terminals connected to a load, wherein the circuit comprises a power factor control cell and a regulation block feedback-connected thereto, said power factor control cell comprising a bipolar transistor inserted between said first and second input terminals and having a control terminal connected to an output terminal of said regulation block, the circuit further comprising at least a supplementary transistor having a conduction terminal connected to said output terminal of said regulation block to reduce the charges in said control terminal of said bipolar transistor and to modulate the conduction time of said bipolar transistor by using its storage time.

12. A control circuit according to claim 11, wherein said control terminal of said bipolar transistor is connected, by means of an RC network, to a winding of a transformer to receive a control signal derived from a signal having an alternate elementary trend.

13. A control circuit according to claim 12, wherein said RC network comprises a first resistor connected in series to a capacitor between said control terminal of said bipolar transistor and said winding.

14. A control circuit according to claim 13, wherein said RC network further comprises a second resistor inserted between the control terminal of said bipolar transistor and said second input terminal of said control circuit.

15. A control circuit according to claim 11, wherein said power factor control cell comprises a third input terminal.

16. A control circuit according to claim 13, wherein said power factor control cell comprises a forth input terminal connected to said output terminal of said regulation block in correspondence with an interconnection point of said first resistor and capacitor of said RC network.

17. A control circuit according to claim 11, wherein said regulation block comprises said supplementary transistor, inserted between said output terminal and a voltage reference and having a control terminal connected to an inner circuit node.

18. A control circuit according to claim 11, wherein it further comprises a Shottky diode inserted between said output terminal and said conduction terminal of said supplementary transistor.

19. A control circuit according to claim 11, wherein said regulation block has a first input terminal connected to said first output terminal of said control circuit and a second input terminal connected to said first input terminal of said control circuit, said first and second input terminals being connected to each other by means of a first and second resistive elements, interconnected in correspondence with a further inner circuit node.

20. A control circuit according to claim 19, wherein said regulation block further comprises a Zener diode) inserted between said inner circuit node and said further inner circuit node.

21. A control circuit according to claim 17, wherein said regulation block has a third input terminal connected to said inner circuit node by means of the series of a diode, a resistor and a further Zener diode.

22. A control circuit according to claim 21, wherein said regulation block further comprises an electrolytic capacitor inserted between an interconnection node between said diode and said resistor and said voltage reference.

23. A control circuit according to claim 11, wherein said regulation block receives respective signals:
   an output signal corresponding to an output voltage signal of said power factor control cell applied to said first input terminal;
   a primary input signal corresponding to a voltage value of said power supply line applied to said second input terminal; and
   an outer pre-heating signal applied to said third input terminal.

24. A control circuit according to claim 11, wherein said power factor control cell is of the self-oscillating type.

25. A control circuit according to claim 24, wherein said power factor control cell receives at said third input terminal an oscillating driving signal.

26. A lighting system of the type comprising the series of a diode-bridge input section, an electronic ballast and a fluorescent lamp, wherein it comprises at least a power factor control circuit inserted between said input section and said electronic ballast, said control circuit being realized according to claim 11.

27. A method for controlling the power factor of a power supply line, comprising:
   modulating a conduction time of a bipolar transistor using a storage time of the bipolar transistor; and
   regulating the modulation of the conduction time through a feedback signal applied to a control terminal of the bipolar transistor.

28. A method for controlling the power factor of a power supply line, comprising:
   modulating a conduction time of a bipolar transistor using a storage time of the bipolar transistor; and
   regulating the modulation of the conduction time through a feedback signal applied to a control terminal of the bipolar transistor by providing current injection into the control terminal of the bipolar transistor.

29. A control circuit operable to control the power factor of a power supply line, the control circuit comprising:
   a power factor control cell having input terminals adapted to receive the power supply line and having output terminals, the power factor control cell including a bipolar transistor coupled between the input terminals;
   a regulation block coupled between the input terminals and the output terminals of the power factor control cell, the regulation block operable to provide a feedback signal to a control terminal of the bipolar transistor responsive to signals on the output terminals; and
   a supplementary transistor operable to reduce charges applied to the control terminal of the bipolar transistor and to modulate a conduction time of the bipolar transistor using a storage time of the bipolar transistor.

30. An electronic system, comprising:
   an input filter adapted to receive supply line signals on input terminals and to provide filtered supply line signals on output terminals responsive to the supply line signals;
   a power factor control cell having input terminals coupled to the output terminals of the input filter and having output terminals, the power factor control cell including a bipolar transistor coupled between its input terminals;
   a regulation block coupled between the input terminals and the output terminals of the power factor control cell, the regulation block operable to provide a feedback signal to a control terminal of the bipolar transistor responsive to signals on the output terminals, the regulation block operable to modulate the conduction time of the bipolar transistor using the storage time of the bipolar transistor and to regulate the modulation of the conduction time through the feedback signal; and
   a load circuit coupled to the output terminals of the power factor control cell.

31. The electronic system of claim 30, wherein the load circuit comprises:
   an electronic ballast circuit coupled to the output terminals of the power factor control cell; and
   a fluorescent lamp coupled to the electronic ballast circuit.

* * * * *

UNITED STATES PATENT AND TRADEMARK OFFICE
CERTIFICATE OF CORRECTION

PATENT NO. : 7,852,014 B2  
APPLICATION NO. : 11/601460  
DATED : December 14, 2010  
INVENTOR(S) : Rosario Scollo et al.

Page 1 of 1

It is certified that error appears in the above-identified patent and that said Letters Patent is hereby corrected as shown below:

In the Claims:

- In Claim 16, Column 10, Line 52 of the patent, please change the text "comprises a forth input terminal" to -- comprises a fourth input terminal --.

- In Claim 20, Column 11, Line 7 of the patent, please change the text "comprises a Zener diode) inserted" to -- comprises a Zener diode inserted --.

Signed and Sealed this
Twenty-second Day of March, 2011

David J. Kappos
*Director of the United States Patent and Trademark Office*